United States Patent [19]

Kimata et al.

[11] 4,205,636
[45] Jun. 3, 1980

[54] APPARATUS FOR CONTROLLING THE AIR FUEL MIXTURE OF AN INTERNAL COMBUSTION ENGINE

[75] Inventors: Kei Kimata, Shizuoka; Tsugito Nakazeki, Iwata; Haruhisa Harada, Kakegawa, all of Japan

[73] Assignee: NTN Toyo Bearing Company, Limited, Osaka, Japan

[21] Appl. No.: 923,700

[22] Filed: Jul. 11, 1978

[30] Foreign Application Priority Data

Jul. 12, 1977 [JP] Japan ............................ 52/103064
Sep. 13, 1977 [JP] Japan ............................ 52/110986

[51] Int. Cl.$^2$ ............................ F02B 3/08; F01N 3/08
[52] U.S. Cl. ............................ 123/32 EE; 123/32 EA; 60/285; 60/276
[58] Field of Search ........ 123/32 EE, 32 EA, 32 AB, 123/119 EC; 60/285, 276

[56] References Cited

U.S. PATENT DOCUMENTS

| | | | |
|---|---|---|---|
| 3,750,632 | 8/1973 | Zechnall | 123/146.5 A |
| 3,949,714 | 4/1976 | Mitchell | 123/32 EA |
| 4,043,300 | 8/1977 | Lombard | 123/32 EA |
| 4,046,120 | 9/1977 | Laprade et al. | 123/119 EC |
| 4,083,342 | 4/1978 | Bertling | 123/119 EC |

*Primary Examiner*—Charles J. Myhre
*Assistant Examiner*—P. S. Lall
*Attorney, Agent, or Firm*—Armstrong, Nikaido, Marmelstein & Kubovcik

[57] ABSTRACT

A fuel feeding apparatus for internal combustion engines comprises an area type air flow rate measuring section in which the air flow rate is dependent on the displacement of an air flow rate detecting valve, and a fuel flow rate measuring and distributing section in which a variable orifice defined by a rotor and a stator determines the fuel flow rate proportional to the air flow rate. This apparatus is characterized by the provision of an exhaust gas sensor disposed in the exhaust pipe for the detection of the oxygen concentration of the exhaust gas in order to achieve the complete combustion of fuel in the internal combustion engine, the output signal from the exhaust gas sensor being used to compensate the fuel feeding pressure and a spring force which acts on the pressure difference setting diaphragm of a servo-mechanism.

7 Claims, 11 Drawing Figures

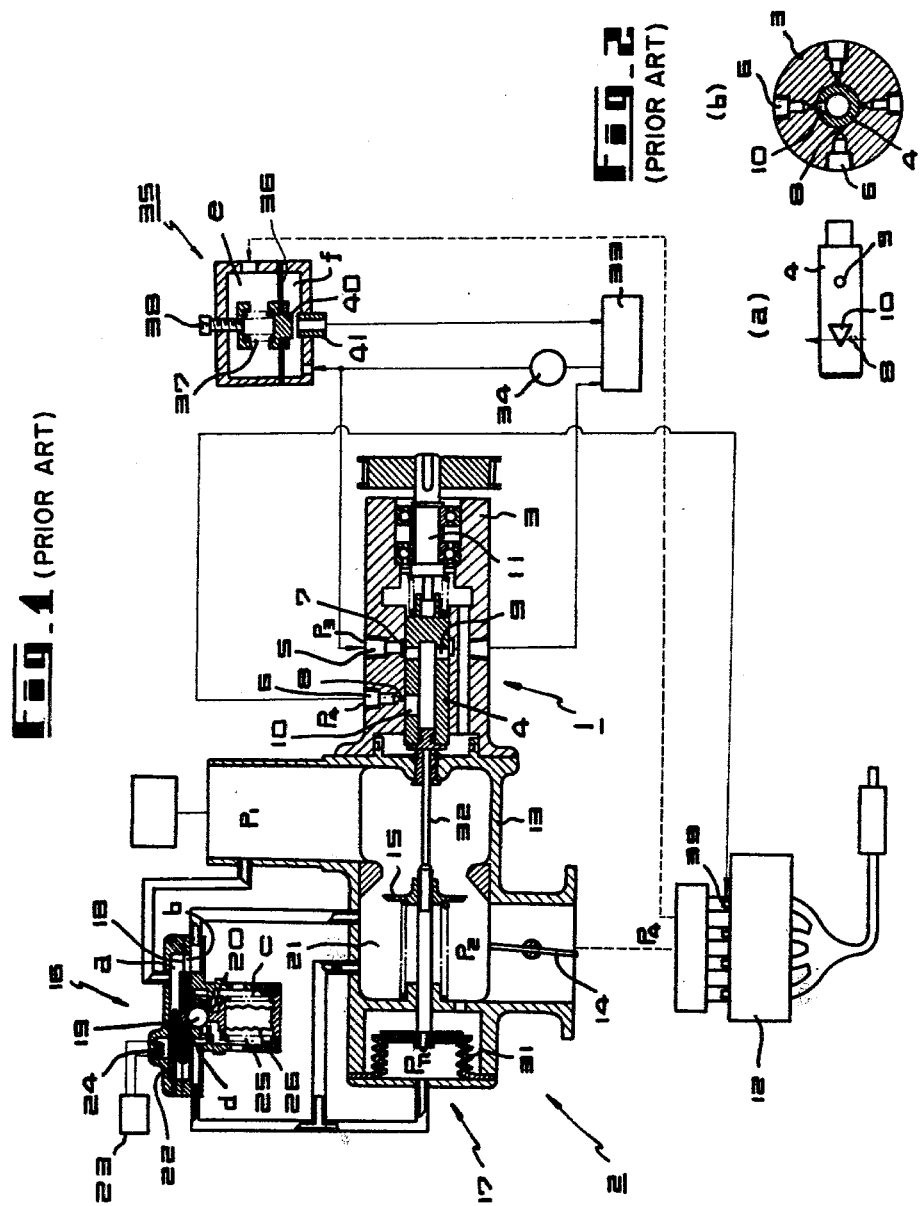

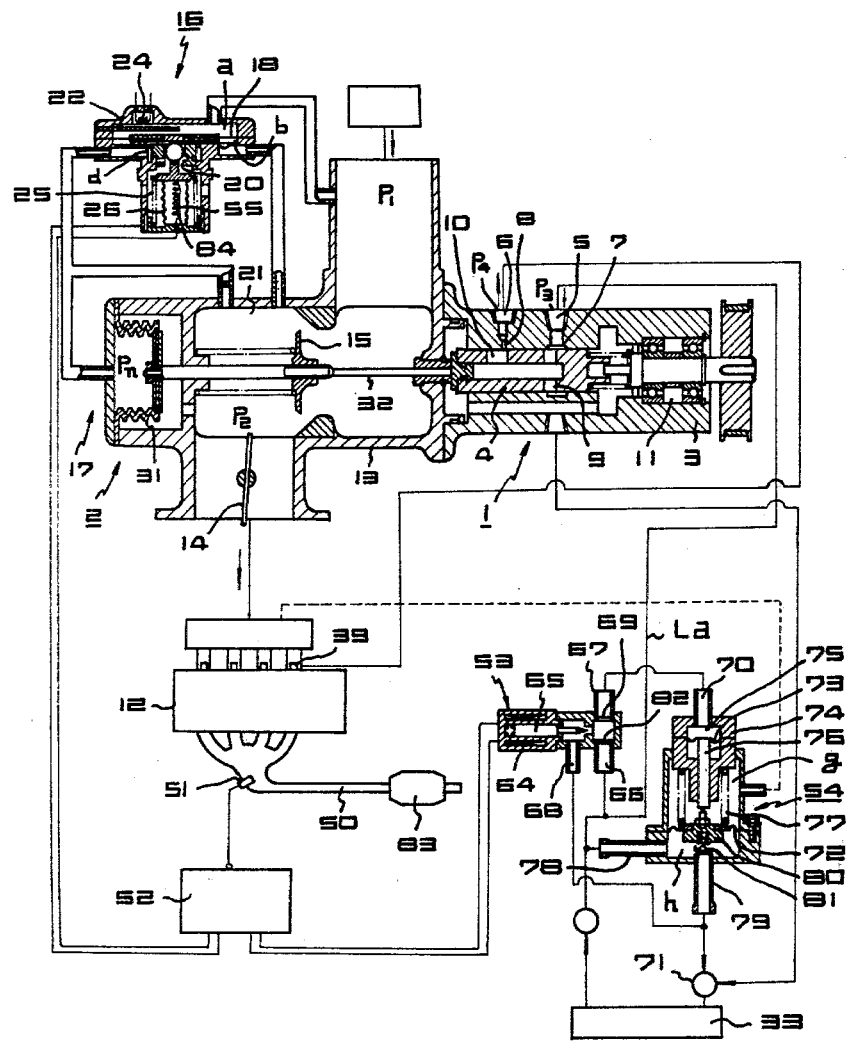

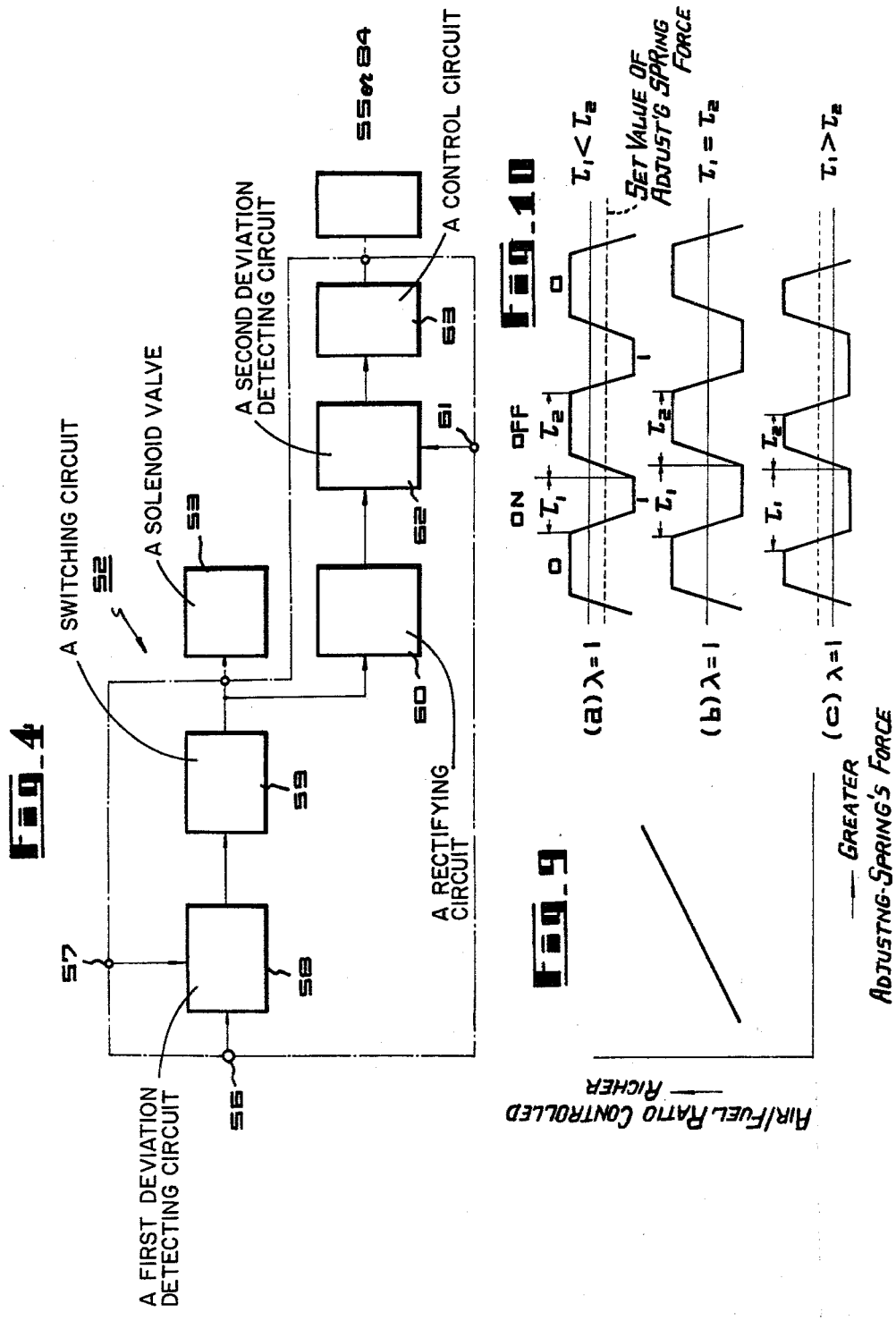

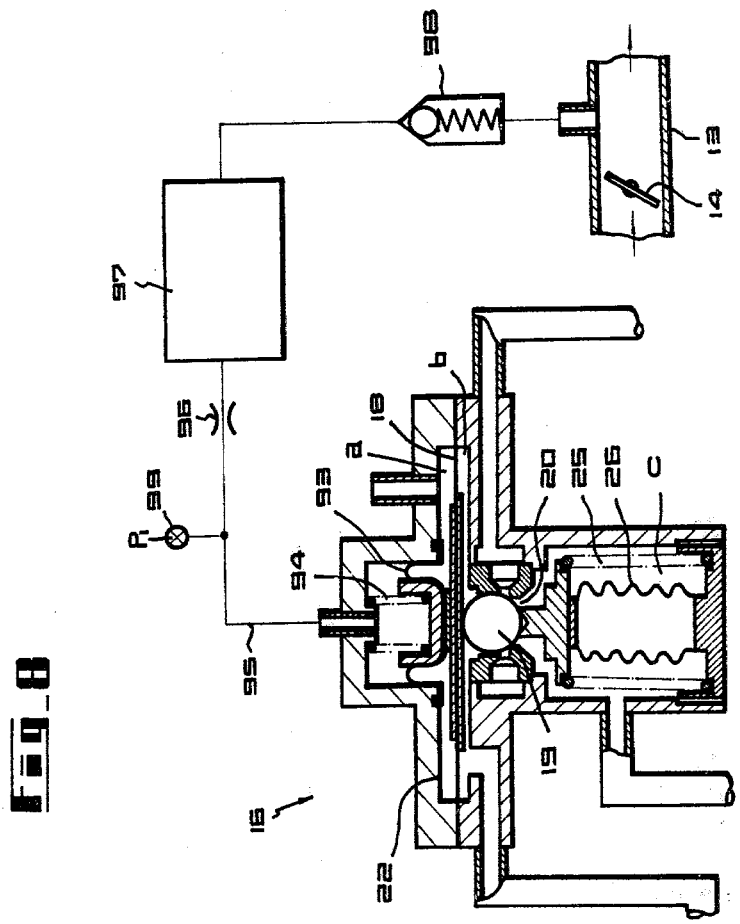

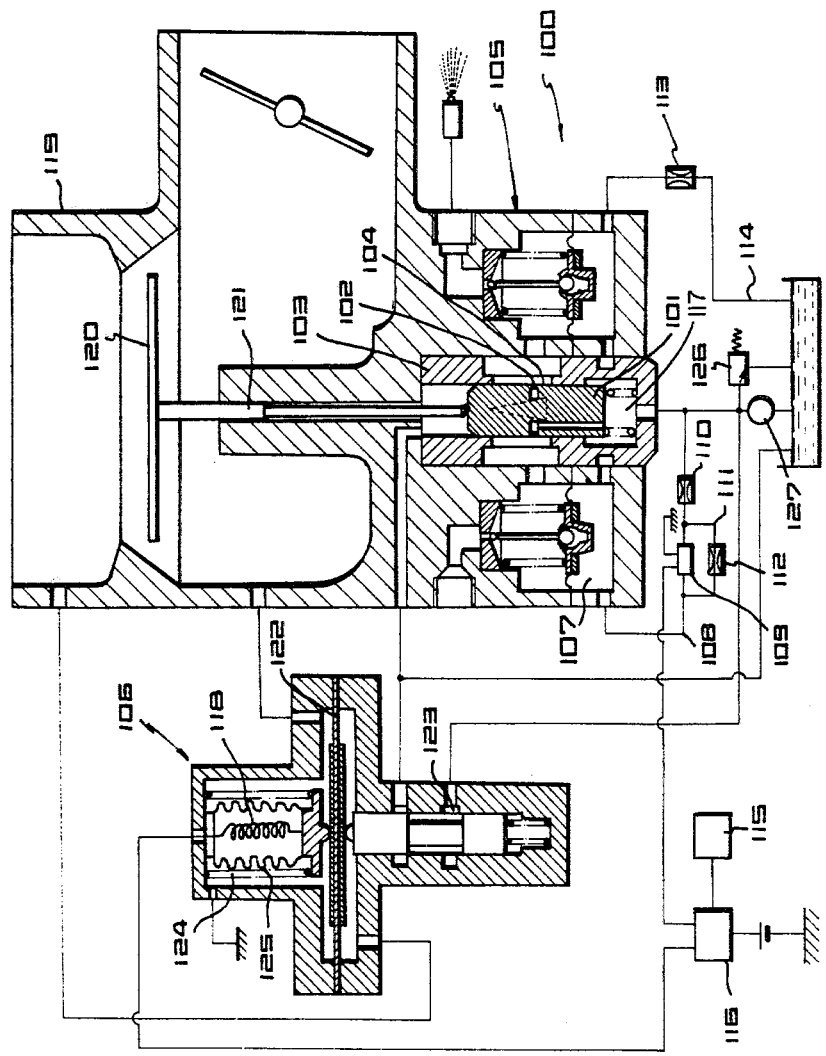

APPARATUS FOR CONTROLLING THE AIR FUEL MIXTURE OF AN INTERNAL COMBUSTION ENGINE

BACKGROUND OF THE INVENTION (a) Field of the Invention

The present invention relates to a fuel feeding apparatus for internal combustion engines which comprises an area type air flow rate measuring section in which the air flow is dependent on the displacement of an air flow rate detecting valve, and a fuel flow rate measuring and distributing section in which a variable orifice defined by a rotor and a stator determines the fuel flow rate proportional to the air flow rate, said apparatus being characterized in that the air-fuel ratio is compensated by the output signal from an exhaust gas sensor disposed in the exhaust pipe.

(b) Description of the Prior Art

Various types of such fuel feeding apparatus have already been invented. An example thereof is shown in FIG. 1. In FIG. 1, the numeral 1 designates a fuel flow rate measuring and distributing section and 2 designates an area type air flow rate measuring section. The measuring and distributing section 1 comprises a stator 3 and a rotor 4. The stator 3 has a fuel inlet 5 and fuel outlets 6. The inlet 5 is formed with an annular groove 7, while each outlet is formed with an orifice 8. The rotor 4 has a fuel inlet 9 which is in constant communication with said inlet 5 through said annular groove 7, and a triangular window 10 which opens to an outlet 8. The rotor 4 is rotated in synchronism with an engine 12 through a shaft 11 and is axially slid as the flow rate detecting valve 15 of the area type air flow rate measuring section 2 is moved, as will be later described in more detail, thereby changing the time during which the triangular window 10 opens to the orifice 8. (See FIG. 2)

The area type air flow rate measuring section 2 comprises a servo-valve mechanism 16 adapted to sense the pressure difference (P1−P2) across a flow rate detecting valve 15 disposed upstream of a throttle valve 14 placed in a suction pipe 13 and maintain said pressure difference at a fixed value and amplify the same, and a valve opening mechanism 17 adapted to control the pressure difference (P1−P2) across the flow rate detecting valve 15 by using a pressure Pn amplified by the servo-valve mechanism 16. The servo-valve mechanism 16 comprises a chamber a subjected to a pressure P1, a chamber b subjected to a pressure P2, said chambers a and b being separated from each other by a diaphragm 18, a chamber c maintained at the same pressure as the pressure P1 in the chamber a, a variable orifice 20 whose area of opening is varied by a ball valve 19 fixed to the diaphragm 18, and a chamber d at a pressure Pn which is varied by the orifice 20 within the range of the pressure difference (P1−P2) between the chamber c and an intermediate chamber 21 (which is disposed between the flow rate detecting valve 15 and the throttle valve 14). The numeral 22 designates a bimetal disposed in the chamber a for controlling the diaphragm 18 so that the air-fuel ratio will be reduced, i.e., the amount of fuel in the mixed gas will be increased during the warm-up of the engine, the arrangement being such that when a heater 24 is energized through a switch 23, the bimetal 22 will be bent upward to release the diaphragm. The numeral 25 designates a pressure difference setting spring disposed in the chamber c, and 26 designates a bellows containing a gas at a reference temperature and a reference pressure, the effective area of said bellows 26 being determined so that (the effective area of the bellows 26)×(the pressure of the reference gas)=(the effective area of the pressure difference setting diaphragm 18 of the servo-valve mechanism 16)×(the difference pressure at the reference temperature and pressure). In addition, the bellows 26 is used to ensure that the area of opening of the flow rate detecting valve 16 will be proportional to the weight flow rate of air, and it is unnecessary if said area of opening is to be proportional to the volume flow rate of air.

The valve opening mechanism 17 causes the pressure Pn in the servo-valve mechanism 16 to act on a bellows 31 to control the axial position of the shaft 32 of the flow rate detecting valve so that the pressure difference P1−P2 across the flow rate detecting valve 15 will have a certain fixed value. The shaft 32 of the flow rate detecting valve controls the axial position of the rotor 4 of the fuel flow rate measuring and distributing section 1 so that the time of communication of a fuel metering port defined by the orifice 8 and triangular window 10 will be proportional to the weight flow rate of air. The numeral 33 designates a fuel tank; 34 designates a fuel pump; and 35 designates a pressure regulator. The pressure regulator 35 is divided into chambers e and f. The chamber e has installed therein a difference pressure setting spring 37 and an adjusting screw 38 and is subjected to a negative pressure P4 existing in the vicinity of an injector 39 at the suction pipe 13, while the chamber f has installed therein a valve seat 40 fixed to the diaphragm 36 and a valve 41, said valve seat 40 and valve 41 constituting a variable valve. The chamber f communicates with the fuel pump 34 and with the inlet 5 of the fuel flow rate measuring and distributing section 1, while the valve 41 communicates with the fuel tank 33. Therefore, the diaphragm 36 is subjected to the suction pipe negative pressure P4 in the vicinity of the injector 39 and to the feed pressure P3 at which the fuel is fed to the measuring and distributing section 1, so that it detects the pressure difference P3−P4. If the pressure P4 changes, the diaphragm 36 will be bent upward to increase the area of opening between the valve seat 40 and the valve 41, thus increasing the amount of fuel flowing from the valve 41 back to the fuel tank 33. As a result, the feed pressure P3 is reduced, and when a predetermined pressure difference is reached, the diaphragm 36 will be balanced and come to rest. In brief, the pressure regulator 35 maintains the pressure difference P3−P4 across the fuel metering and distributing section 1 at a fixed value irrespective of variations in the suction pipe negative pressure P4, thereby ensuring that the time of communication between the orifice 8 and the triangular window 10 will be uniquely proportional to the flow rate of fuel.

Because of the arrangement described above, the time of communication of the orifice is proportional to the area of opening of the flow rate detecting valve 15, as described above. As a result, the fuel flow rate is proportional to the weight flow rate of air, so that the air-fuel ratio is maintained at a constant value.

SUMMARY OF THE INVENTION

The present invention realtes to a fuel feeding apparatus of the type in which the pressure difference across a throttle valve disposed in a suction pipe is maintained at a constant value by a servo-mechanism utilizing fluid pressure and the amount of air being sucked into an internal combustion engine is measured by the degree of opening of the throttle valve while the degree of opening of the throttle valve is caused to be uniquely associated with the amount of communication of a fuel metering gate disposed in a fuel feed passage, said apparatus being characterized by the provision of a control mechanism wherein a set value for a pressure regulating valve or pressure difference regulating valve which is adapted to maintain the pressure difference across said fuel metering gate is controlled by an on-off action brought about by a signal from an exhaust gas sensor disposed in an exhaust pipe, while the on-off signal is rectified and the basic servo-set value for said servo-mechanism is controlled so that the value of said on-off signal will attain a predetermined value, the time ratio of the on-off action provided by the signal from the exhaust gas sensor being maintained at a predetermined value, thereby making it possible to improve the responsivity and obtain a constant on/off time ratio, which improves the control accuracy. Further, since any desired air-fuel ratio can be obtained by changing the set value associated with the heater side, it is possible to meet cayalyst requirements.

According to the invention, a solenoid valve adapted to be actuated by an output from the exhaust gas sensor, and a hydraulic pressure regulator having a hydraulic cylinder disposed in parallel with a pressure-sensitive diaphragm and with a pressure difference setting spring for said solenoid valve, are disposed in the feed line of the fuel flow rate measuring and distributing section. The hydraulic pressure acting on the hydraulic cylinder is controlled by said solenoid valve to correct the set pressure for the hydraulic regulator and control the fuel flow rate. Therefore, the responsivity of the control action is improved and hence the exhaust gas control in the period of engine transition is improved.

According to the invention, the spring force acting on the pressure difference setting diaphragm of the servo-mechanism is controlled by changing the gas pressure in the cavity of the bellows or second diaphragm engaged with the pressure difference setting diaphragm. Further, said gas pressure is controlled by a signal from a combustion gas sensor, thus making it possible to achieve complete combustion in the internal combustion engine.

BRIEF DESCRIPTION OF THE DRAWINGS

FIG. 1 is an explanatory view of a known fuel feeding apparatus for internal combustion engines;

FIGS. 2a and 2b are views showing the constructions of a rotor and a stator, respectively, in the fuel flow rate measuring and distributing section of the apparatus shown in FIG. 1;

FIG. 3 is an explanatory view of a fuel feeding apparatus according to the present invention;

FIG. 4 is an explanatory view of a control unit;

FIG. 8 is a view showing another modification of the device shown in FIG. 7;

FIG. 9 is a graph showing the relationship between the excess air factor λ after control and the force of the adjusting spring of a pressure regulator;

FIG. 10 is a graph showing the relationship between the fuel pressure Pf, excess air factor λ and the set spring pressure for the adjusting spring; and FIG. 11 is an explanatory view of another embodiment of the present invention.

DESCRIPTION OF THE PREFERRED EMBODIMENTS

Figure 7:
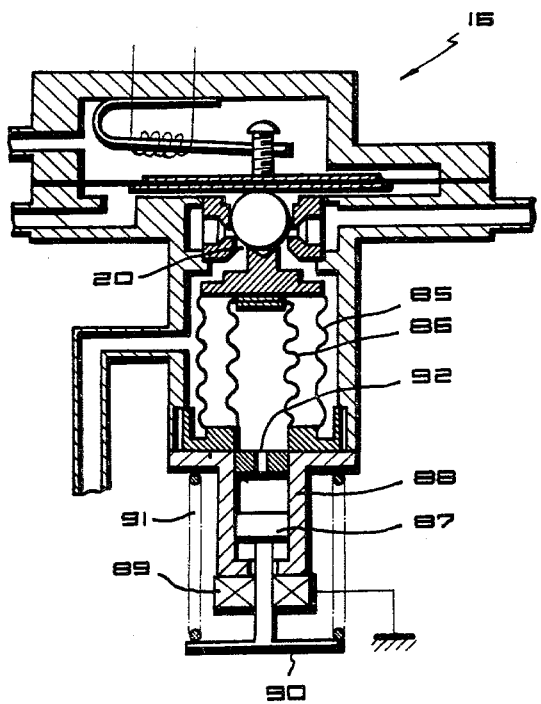
FIG. 7 is a view showing a modification of the device for controlling the spring force on the pressure difference setting diaphragm of a servo-mechanism by a signal from a combustion gas sensor.

In FIG. 3, the parts which are the same as those of the conventional apparatus shown in FIG. 1 are indicated by like reference numerals.

According to the present invention, an exhaust gas sensor 51 is provided in the exhaust manifold 50 of an engine 12 in order to detect the burning condition of the mixed gas. The output from the exhaust gas sensor 51 is processed by a control unit 52 to actuate a solenoid valve 53 disposed in a fuel feed line La and control the set pressure for a pressure regulator 54 while actuating a compensating element 55 which compensates the spring force acting on the diaphragm 18 of a servo-mechanism 16, thereby compensating the air-fuel ratio.

As shown in FIG. 4, the control unit 52 comprises a first input terminal 56 which receives an output from the exhaust gas sensor 51, a second terminal 57 which receives an input of predetermined value which is separately set, a first deviation detecting circuit 58 which compares the signals at the terminals 56 and 57, a switching circuit 59 which on-off-controls said solenoid valve 53 in fuel feed line La by a signal from said first deviation detecting circuit 58, a rectifiying circuit 60 which receives and rectifies a signal from said switching circuit 59, a second deviation detecting circuit 62 which makes a comparison between a signal rectified by the rectifying circuit 60 and a set value from a third terminal 61, and a control circuit 63 which controls the voltage to be applied to the compensating element 55 installed in the servo-mechanism 16 by a signal from the second deviation detecting circuit 62.

The solenoid valve 53 comprises a solenoid 64, a spool 65 adapted to be advanced and retracted within the solenoid 64, and communication ports 66, 67 and 68. The solenoid 64 is controlled by the output from the switching circuit 59 of the control curcuit 52. The communication port 66 has an orifice 82 connected to the feed lin La, the communication port 67 communicates with the communication port 70 of the pressure regulator 54 through an orifice 69, and the communication port 68 communicates with a fuel tank 33 through a drain pump 71.

On the side of the chamber g of the pressure regulator 54 divided by a pressure-sensitive diaphragm 72, a hydraulic cylinder 74 with a diaphragm 73 disposed in the middle is fixed to the pressure regulator 54, the chamber 75 above the diaphragm 73 being formed with said communication port 70. Further, the diaphragm 73 is connected to the pressure-sensitive diaphragm 72 through a connecting rod 76. The numeral 77 designates a pressure difference setting spring for the pressure-sensitive diaphragm 72. A chamber h below the pressure-sensitive diaphragm 72 is provided with a communication port 78 connected to the feed line La and a communication port 79 communicating with the fuel tank 33 through the drain pump 71. The communication port 79 cooperates with a valve 80 fixed to the pressure-sensitive diaphram 72 to define a clearance 81 to control the flow rate of fuel flowing back to the fuel tank 33.

When the air-fuel ratio changes with the change of the operating condition, it is detected by the exhaust gas sensor 51 disposed in the exhaust manifold 50. For example, when the air-fuel ratio is smaller than the theoretical air-fuel ratio, i.e., when the mixed gas is fuel-rich, the control unit 52 produces an output with the theorectical air-fuel ratio as the reference. This output signal actuates the solenoid valve 53. Thus, the solenoid 64 retracts the spool 65, i.e., it actuates the spool in the direction in which the spool is thereby opened. As a result, fuel is introduced from the feed line La into the communication port 66, with an increased amount of fuel flowing back to the fuel tank 33 from the orifice 82 via the communication port 68 and drain pump 71, while fuel is introduced from the orifice 69 into the communication port 67 and then into the communication port 70 of the pressure regulator 54, so that the liquid pressure acting on the diaphragm 73 of the pressure regulator 54 is reduced. This reduction of liquid pressure upwardly displaces the diaphragm 73, upwardly moving the pressure-sensitive diaphragm 72 through the connecting rod 76 against the setting force of the pressure difference setting spring 77. The upward movement of the pressure-sensitive diaphragm 72 increases the area of opening of the clearance 81 defined by the valve 80 and communication port 79. Ultimately, this reduces the resistance to the flow of fuel flowing from the feed line La successively through the communication port 78, the chamber h of the pressure regulator 54, the clearance 81, the communication port 79 and the drain pump 71 and back to the fuel tank 33. Therefore, the feed pressure P3 in the feed line La is reduced by an amount corresponding to the resistance to the return fuel flow and becomes P3'. In addition, the fuel flowing from the solenoid valve 53 back to the fuel tank 33 is constricted by the orifice 82 and is so small in amount that it has no effect on the feed pressure P3 in the feed line La. Consequently, the flow rate of fuel measured by the orifice 8 and triangular window 10 of the fuel flow rate measuring and distributing section 1 is reduced by an amount corresponding to P3−P3', so that the air-fuel ratio is increased to be corrected approximately to the theoretical air-fuel ratio.

The foregoing refers to the compensating operation where the air-fuel ratio is smaller than the theoretical air-fuel ratio, i.e., where the mixed gas is fuel-rich. However, when the air-fuel ratio is greater than the theoretical air-fuel ratio, i.e., when the mixed gas is fuel-lean, it will be corrected to the theortical air-fuel ratio in the reverse action by increasing the feed pressure P3 to reduce the air-fuel ratio.

Figure 5:
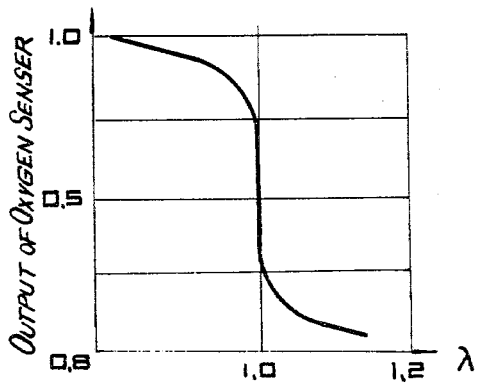
FIG. 5 is a graph showing the output characteristic of a sensor which detects the oxygen concentration in the exhaust gas.

Usually, when the exhaust gas is purified with a three-element catalyst 83, it is desirable to control the air-fuel ratio so that it is equal to the theoretical air-fuel ratio. That is, it is desirable that the excess air factor $\lambda$, defined as the ratio of the air-fuel ratio to the theoretical air-fuel ratio, be equal to 1. In this case, an oxygen gas sensor is suitable as the exhaust gas sensor. Further, it is known that the output from the oxygen gas sensor 51 for detecting the oxygen concentration in the exhaust gas will exhibit a characteristic which changes at the theoretical air-fuel ratio, or $\lambda=1$, like a step function, as shown in FIG. 5. The output from the exhaust gas sensor 51 is fed to the control unit 52 so that the latter may actuate the compensating element 55 which compensates the spring force acting on the pressure difference setting diaphragm 18 of the servo-mechanism 16.

Figure 6:
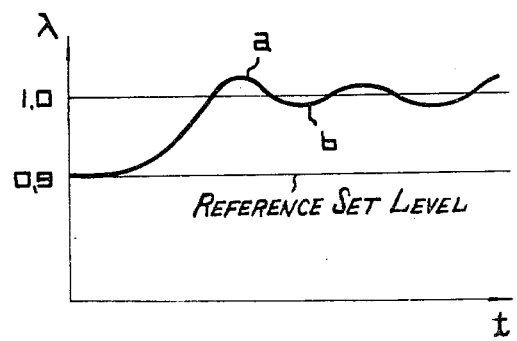
FIG. 6 is a graph showing the relationship between the oxygen gas concentration in the exhaust gas and the set point for a switching unit.

FIG. 3 shows the use of a heater 84 as said compensating element 55, said heater 84 being installed in the bellows 26. If the basic setting level for the servo-mechanism 16 is set, for example, at $\lambda=0.9$ on the fuel-rich side, as shown in FIG. 6, then since the oxygen concentration in the exhaust gas is low, the control circuit 63 shown in FIG. 4 is turned on to energize the heater 84, so that the gas enclosed in the bellows 26 and its pressure are increased and hence the upward force acting on the diaphragm 18 is increased, upsetting the balance of the forces on said diaphragm 18, and the variable orifice 20 is thereby opened. Thereupon, the pressure Pn in the chamber D is increased, displacing the bellows 31 of the valve opening mechanism 17, so that the flow rate detecting valve 15 is displaced in the closing direction. The rotor 4 is then moved to the right as viewed in the figure. Therefore, the amount of fuel relative to the amount of suction air is reduced to shift the air-fuel ratio to the fuel-lean side. As a result, the oxygen concentration in the exhaust gas and hence $\lambda$ are increased to the extent that the output from the exhaust gas sensor disappears, deenergizing the heater 84 at point a. Thereupon, the gas enclosed in the difference pressure setting bellows 26 contracts and the variable orifice 20 returns to the basic set level side, thereby increasing the amount of fuel relative to the amount of suction air. When the air-fuel ratio is reduced and the mixed gas is shifted to the fuel-rich side, the heater 84 is energized again at point b, shifting the mixed gas to the fuel-lean side by increasing the air-fuel ratio. Such on-off control of the heater by the control unit makes it possible to control the air-fuel ratio so that it is nearly equal to the theoretical air-fuel ratio, i.e., $\lambda\approx 1$.

In the system described above, if the relation Pdo·Sd = Pd·Sb is established where Sb is the area of the bellows, Pb is the absolute pressure of the gas enclosed in the bellows in the reference condition, and the Pd is the reference value of the pressure difference across the flow rate detecting valve 15, and Sd is the effective area of the pressure difference setting diaphragm 18 of the servo-valve mechanism 16 then with no current flowing through the heater in the bellows it follows that $\gamma\times(P1-P2)=$ constant where $\gamma$ is the density of the suction air, and hence the degree of opening of the flow rate detecting valve is proportional to the weight flow rate. Therefore, it follows that the basic set level of the air-fuel ratio is maintained constant irrespective of atmospheric pressure (altitude) and the temperature of the suction air.

FIG. 7 shows another embodiment of a servo-mechanism 16, wherein two bellows 85 and 86 are provided. A gas in the reference condition is enclosed in a space between the outer and inner bellows 86 and 86 so as to compensate for variations in the density of the suction air, and the pressure of the gas in the inner bellows 86 is made variable by means of a piston 87, cylinder 88 and solenoid 89 for the purpose of compensation. Thus, when the control unit 52 produces an on-signal, the solenoid 89 is energized to attract a magnetic plate 90 provided on the lower end of the piston 87 against the force of a spring 91. Therefore, the gas in the cylinder is forced out into the pressure difference setting bellows 18 to increase the pressure in said bellows. This results in opening the variable orifice 20, increasing the air-fuel ratio, i.e., shifting the mixed gas to the fuel-lean side. In addition, the numeral 92 designates a choke disposed at the open end of the cylinder 88 and serves to prevent the gas in the bellows 86 from being forced out suddenly. When the signal from the control unit 52 is cut off, the piston 87 is returned to its original position by the force of a spring 91 and the pressure in the bellows 86 resumes its original value, reducing the air-fuel ratio, i.e., shifting the mixed gas to the fuel-rich side.

FIG. 8 shows another modification of the servo-mechanism, wherein a second diaphragm 93 and a return spring 94 are provided above the diaphragm of the servo-mechanism, the inner side of said diaphragm 93 being connected to a vacuum tank 97 through a line 95 and a choke 96. The vacuum tank 97 communicates with the downstream side of the throttle valve 14 of the suction pipe of the engine through a check valve 98. The line 95 is open to atmospheric pressure P1 through a variable choke or a valve 99. The negative pressure in the suction pipe is collected in the vacuum tank 97 and is on-off controlled by an exhaust gas sensor attached to the exhaust pipe, as in the embodiment described above, to change the pressure in the bellows 93, thereby compensating the air-fuel ratio.

The foregoing description refers to a method of controlling the pressure in the bellows provided in the servo-mechanism by a signal from the exhaust gas sensor. However, by making said pressure variable according to the degree of opening of the throttle valve, variations in the negative pressure in the suction pipe, the temperature at the start of the engine, etc., it is possible to compensate the amount of fuel to increase the same at the time of idling, at the time of running at full throttle, at the start of the engine, etc. Further, it goes without saying that the present invention is not limited to the embodiments described above but is applicable to a case where a mixed gas of fuel and air is fed to a furnace.

Even if the set pressure of the pressure difference setting spring 77 of the pressure regulator 54 is within the range of control, there is the possibility of the mixed gas being deviated to the fuel-rich or fuel-lean side depending upon the running conditions of the engine. It has been ascertained that if the force of the spring 77 is set at the fuel-rich side, the air-fuel ratio after control is deviated to the reduced side, as shown in FIG. 9.

FIG. 10 is a graph showing the relationship between fuel pressure Pf, the excess air factor λ (where λ=air-fuel ratio/theoretical air-fuel ratio), and the set pressure of the pressure difference setting spring. In the graph, $\tau_1$ is the time during which the solenoid valve 53 is on and $\tau_2$ is the time during which it is off. In order to control the excess air factor λ so that it is equal to 1, it is most preferable to maintain the ratio of $\tau_1$ to $\tau_2$ constant throughout the operating range.

The output from the exhaust gas sensor 51 is delivered as an on-off signal by the switching circuit 59, as described above. This on-off signal is fed to the rectifying circuit 60 in such a manner that when the switching circuit 59 is on, it is 1 and when said circuit is off, it is 0, said signal being rectified therein and then fed to the second deviation detecting circuit 62. For example, in the case of FIG. 10a, and therefore the output from the rectifiying circuit 60 is less than 0.5. At the same time, a set value such that $\tau_1 = \tau_2$, i.e., 0.5, is fed from the terminal 61, and a signal will be kept delivered until the result of comparison between the two values becomes zero. In this case, the voltage applied to the heater 84 of the servo-mechanism 16 is controlled by the control circuit 63 in a direction in which it is thereby reduced so as to lower the temperature in the bellows, thereby controlling the basic set value for the servo-mechanism 16 in a direction to reduce the air-fuel ratio. In the case of FIG. 10b also, the output from the rectifying circuit is between 0.5 and 1, and the air-fuel ratio is controlled to be shifted toward the increasing side until the difference between the output and the comparison set value 0.5 is zero, thereby achieving $\tau_1 = \tau_2$.

FIG. 11 shows another embodiment of the invention, wherein a fuel metering and distributing mechanism 100 is designed to continuously meter fuel in connection with the amount of suction air. More particularly, a fuel metering gate is constituted by an annular slit 102 formed in a spool 101 and substantially triangular windows 104 formed in a sleeve 103. The numeral 105 designates a pressure difference control unit whereby the pressure drop at the fuel metering gate 102, 104 is maintained constant. A servo-mechanism 106 uses the fuel pressure as the control pressure and the output acts on the upper surface of the spool 101. A pipe 108 which connects the higher pressure chamber 107 of the pressure difference control unit 105 to the fuel source pressure is provided with a solenoid valve 109 and a choke 110, and a pipe 111 which bypasses the solenoid valve is provided with a choke 112. The numeral 113 designates a choke provided in a return pipe 114.

The output from an exhaust gas sensor 115 actuates a control unit 116 to on-off control the solenoid valve 109 to control the pressure difference between the higher pressure chamber 107 and a lower chamber 117 below the spool 101, thereby controlling the flow rate of fuel flowing through the fuel metering gate 102, 104. A heater 118 is also controlled so that $\tau_1 = \tau_2$. In addition, in the figure, the numeral 119 designates a suction pipe; 120 designates an air flow rate detecting valve; 121 designates a connecting rod; 122 designates a pressure difference setting diaphragm; 123 designates a variable orifice interlocked to the pressure difference setting diaphragm; 124 designates a spring for setting a servo basic set value; 125 designates a bellows; 126 designates a pressure regulator whereby the difference (P1−Pi) between the negative suction pressure and the supply source pressure is maintained at a predetermined value; and 127 designates a fuel pump.

While specific embodiments of the invention have been described in detail with reference to the accompanying drawings, it is to be understood that the invention is not limited thereto and that various changes and modifications may be made by those skilled in the art without departing from the spirit and scope of the invention.

What is claimed is:

1. An apparatus for controlling the air-fuel mixture of an internal combustion engine comprising:
   a control mechanism for actuating a solenoid valve between fully opened and fully closed positions;
   an exhaust gas sensor disposed within an exhaust pipe of said engine, said sensor being designed to supply an electrical signal to said control mechanism;
   a pressure regulating means which prescribes a pressure difference across a fule metering gate; said solenoid valve being disposed so as to regulate signals between said control mechanism and said pressure regulating means so as to adjust said pressure regulating means in response to signals originating from said exhaust gas sensor;
   a fuel flow rate measuring and distributing means disposed in a fuel feed line, and having said fuel metering gate disposed therein;

a throttle valve disposed within a suction pipe, said throttle valve regulating the amount of air being drawn into said engine;

an air flow rate detecting valve disposed within said suction pipe, said air flow rate detecting valve being connected to said fuel metering gate;

a servo-mechanism connected to said control mechanism, said servo-mechanism providing a constant pressure difference across said air flow rate detecting valve disposed within said suction pipe, said air flow rate detecting valve being connected to said fuel metering gate whereby the air fuel ratio supplied to said engine is maintained at a desired constant value.

2. An apparatus for controlling the air-fuel mixture of an internal combustion engine as set forth in claim 1 wherein said control mechanism comprises a first deviation detecting circuit comparing an output from said exhaust gas sensor and an input of a set value which is separately set, a switching circuit on-off controlling said solenoid valve by a signal from said first deviation detecting circuit, a rectifying circuit receiving and rectifying the on-off signal from said switching circuit, a second deviation detecting circuit making a comparison between a value rectified by said rectifying circuit and a set value which is separately set, and a control circuit controlling a compensating element installed in said servo-mechanism by a signal from said second deviation detecting circuit.

3. An apparatus for controlling the air-fuel mixture of an internal combustion engine as set forth in claim 1 wherein the pressure regulating means comprises said solenoid valve, a pressure different setting diaphragm, and a hydraulic regulator having a pressure difference setting spring and a hydraulic cylinder disposed in parallel with said spring, wherein the hydraulic pressure acting on the hydraulic cylinder is controlled by the actuation of said solenoid valve to correct a set pressure for said hydraulic regulator, thereby compensating the flow rate of fuel fed to the fuel flow rate measuring and distributing means.

4. An apparatus for controlling the air-fuel mixture of an internal combustion engine as set forth in claim 3 wherein a force from said spring which acts on said setting diaphragm of the servo-mechanism is compensated by changing the gas pressure in the interior of a bellows disposed to engage said pressure difference setting diaphragm.

5. An apparatus for controlling the air-fuel mixture of an internal combustion engine as set forth in claim 3 wherein a force from said spring which acts on said pressure difference setting diaphragm of the servo-mechanism is compensated by changing the gas pressure in the interior of a second diaphragm disposed to engage said pressure difference setting diaphragm.

6. An apparatus for controlling the air-fuel mixture of an internal combustion engine as set forth in claim 3 wherein a force from said spring which acts on the pressure difference setting diaphragm of the servo-mechanism is compensated by controlling the gas pressure in the interior of a bellows disposed to engage the pressure difference setting diaphragm by a signal from said control mechanism.

7. An apparatus for controlling the air-fuel mixture of an internal combustion engine as set forth in claim 3 wherein a force from said spring which acts on the pressure difference setting diaphragm of the servo-mechanism is compensated by controlling the gas pressure in the interior of a second diaphragm disposed to engage said pressure difference setting diaphragm by a signal from said control mechanism.

* * * * *